United States Patent
Huo

(10) Patent No.: US 12,528,513 B2
(45) Date of Patent: Jan. 20, 2026

(54) VEHICLE CONTROL SYSTEMS AND METHODS USING KINEMATICALLY STABILIZED MACHINE-LEARNING MODEL PREDICTED CONTROLS

(71) Applicant: Toyota Jidosha Kabushiki Kaisha, Toyota (JP)

(72) Inventor: Zhaoyuan Huo, Cupertino, CA (US)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 93 days.

(21) Appl. No.: 18/427,021

(22) Filed: Jan. 30, 2024

(65) Prior Publication Data

US 2025/0242835 A1   Jul. 31, 2025

(51) Int. Cl.
*B60W 60/00* (2020.01)
*B60W 50/00* (2006.01)

(52) U.S. Cl.
CPC .... *B60W 60/0027* (2020.02); *B60W 50/0097* (2013.01); *B60W 2050/0062* (2013.01); *B60W 2520/06* (2013.01); *B60W 2554/4044* (2020.02)

(58) Field of Classification Search
CPC ......... B60W 60/0027; B60W 50/0097; B60W 2554/4044; B60W 2050/0062; B60W 2520/06
See application file for complete search history.

(56) References Cited

U.S. PATENT DOCUMENTS

| | | |
|---|---|---|
| 10,671,076 B1 | 6/2020 | Kobilarov et al. |
| 11,023,749 B2 | 6/2021 | Garimella et al. |
| 11,104,332 B2 | 8/2021 | King et al. |
| 11,465,617 B2 | 10/2022 | Xu et al. |
| 11,726,477 B2 | 8/2023 | Singh et al. |
| 2021/0268653 A1* | 9/2021 | Tian ........................ B25J 9/1664 |
| 2023/0060005 A1 | 2/2023 | Jiang et al. |
| 2024/0217548 A1* | 7/2024 | Pronovost .............. G06N 20/00 |

\* cited by examiner

*Primary Examiner* — Wade Miles
*Assistant Examiner* — Zachary Joseph Wallace
(74) *Attorney, Agent, or Firm* — Dinsmore & Shohl LLP

(57) ABSTRACT

A method for controlling a vehicle based on a kinematically stable trajectory is described. The method includes receiving sensor data, from one or more sensor of an ego-vehicle configured to perceive an environment around the ego-vehicle; predicting, with a machine learning model configured to ingest the sensor data, an acceleration and a curvature defining a trajectory for the ego-vehicle; evaluating the acceleration and the curvature with a kinematics decoder configured to determine that the acceleration and the curvature are kinematically feasible for the ego-vehicle; generating, with the kinematics decoder, one or more outputs based on evaluation of the acceleration and the curvature, wherein the one or more outputs define the kinematically stable trajectory for controlling the ego-vehicle; and controlling the ego-vehicle based on the one or more outputs.

20 Claims, 5 Drawing Sheets

… (1) …

VEHICLE CONTROL SYSTEMS AND METHODS USING KINEMATICALLY STABILIZED MACHINE-LEARNING MODEL PREDICTED CONTROLS

TECHNICAL FIELD

The present disclosure relates to a techniques for kinematically stabilizing predicted vehicle control inputs.

BACKGROUND

Autonomous driving systems utilize sensor inputs to obtain aspects of an environment. The obtained aspects of the environment are evaluated, for example, using a machine learning model configured to generate vehicle controls for an ego-vehicle based on the aspects of the environment. For example, aspects of the environment may include pedestrians moving about the location of a vehicle, other vehicles traversing the environment, as well as fixed objects such as buildings, signs, curbs, and the like. Vehicle controls predicted for the ego-vehicle by the machine learning model currently do not ensure stability, for example, kinematic stability. Accordingly, vehicle control systems utilizing machine learning models may be improved through kinematic stability processes.

SUMMARY

In one embodiment, a method for controlling a vehicle based on a kinematically stable trajectory is described. The method includes receiving sensor data, from one or more sensor of an ego-vehicle configured to perceive an environment around the ego-vehicle; predicting, with a machine learning model configured to ingest the sensor data, an acceleration and a curvature defining a trajectory for the ego-vehicle; evaluating the acceleration and the curvature with a kinematics decoder configured to determine that the acceleration and the curvature are kinematically feasible for the ego-vehicle; generating, with the kinematics decoder, one or more outputs based on evaluation of the acceleration and the curvature, wherein the one or more outputs define the kinematically stable trajectory for controlling the ego-vehicle; and controlling the ego-vehicle based on the one or more outputs.

In another embodiment, an apparatus for controlling a vehicle based on a kinematically stable trajectory, includes: one or more memories comprising processor-executable instructions; and one or more processors configured to execute the processor-executable instructions and cause the apparatus to: receive sensor data, from one or more sensor of an ego-vehicle configured to perceive an environment around the ego-vehicle; predict, with a machine learning model configured to ingest the sensor data, an acceleration and a curvature defining a trajectory for the ego-vehicle; evaluate the acceleration and the curvature with a kinematics decoder configured to determine that the acceleration and the curvature are kinematically feasible for the ego-vehicle; generate, with the kinematics decoder, one or more outputs based on evaluation of the acceleration and the curvature, wherein the one or more outputs define the kinematically stable trajectory for controlling the ego-vehicle; and control the ego-vehicle based on the one or more outputs.

In another embodiment, a vehicle includes one or more sensors configured to collect sensor data of an environment around the vehicle; and a computing device comprising one or more memories comprising processor-executable instructions; and one or more processors configured to execute the processor-executable instructions causing the computing device to: predict, with a machine learning model configured to ingest the sensor data, an acceleration and a curvature defining a trajectory for the vehicle; evaluate the acceleration and the curvature with a kinematics decoder configured to determine that the acceleration and the curvature are kinematically feasible for the vehicle; generate, with the kinematics decoder, one or more outputs based on evaluation of the acceleration and the curvature, wherein the one or more outputs define a kinematically stable trajectory for controlling the vehicle; and control the ego-vehicle based on the one or more outputs.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and are not intended to limit the disclosure. The following detailed description of the illustrative embodiments can be understood when read in conjunction with the following drawings, where like structure is indicated with like reference numerals.

DETAILED DESCRIPTION

Figure 1:
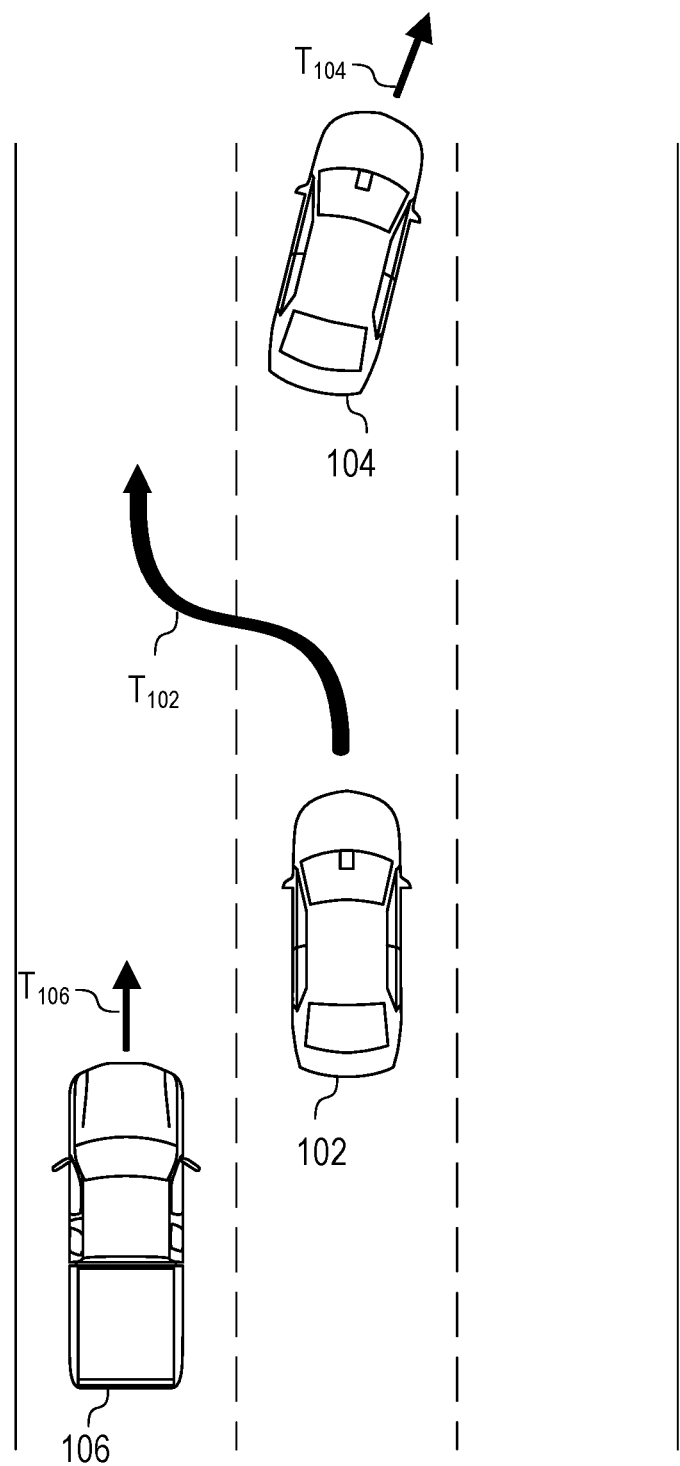
FIG. 1 depicts an illustrative environment of an ego-vehicle having two other vehicles traversing a road near the ego-vehicle.

Embodiments of the present disclosure are directed to techniques for kinematically stabilizing predicted vehicle control inputs. Embodiments described herein address the technical problem that vehicle controls predicted for an ego-vehicle by the machine learning model currently do not ensure stability, for example, kinematic stability.

In autonomous driving systems, two primary types of prediction methods are prevalent: machine learning (ML)-based predictions and heuristic-based predictions. ML-based methods offer dynamic and data-driven predictions, but the predictions generated by ML-based methods can lack stability and may not always adhere to physical constraints and risk avoidance constraints. Heuristic-based predictions can provide stability and risk avoidance measures to vehicle control but lack the adaptability and accuracy of ML-based methods. That is, heuristic-based predictions are generally developed and applied to predefined environments and apparatuses, which accordingly have the technical problem of having a limited application space. In other words, a heuristic-based prediction relies on environmental constants which require multiple heuristic-based predictions to be developed and implemented to cover a large range of environments, such as different driving environments.

Embodiments described herein provide technical solutions that extract the benefits of the each independent method to provide a versatile technical solution that improves the stability and performance of autonomous driving systems. The objective is to integrate a kinematics decoder, for example, using a unicycle model, within an ML-based prediction framework, complemented by heuristic-based predictions to generate kinematically stable trajectories for controlling the ego-vehicle. Approaches described herein predict a series of accelerations and curvatures, subsequently processed through a kinematic decoder (also referred to as a kinematic rollout), to generate trajectories that are data-driven and adhere to heuristic principles, such as acceleration constraints, ensuring kinematic feasibility and enhanced risk avoidance. The technical benefit provided by the solutions described herein include, but are not limited to, systems and methods suitable for a variety of autonomous driving systems, enhancing prediction capabilities across different vehicle types, implementation of customizable constraints through the kinematics decoder enabling increased risk avoidance standards by combining data-driven predictions with safety-centric heuristic constraints, and a robust operational framework capable of providing reliable and consistent predictions. In other words, technical benefits include wider applicability, improved risk avoidance and efficiency, and improved operational robustness.

The following will now describe aspects of the vehicle control systems and methods implementing kinematically stabilized machine-learning model predicted controls for controlling a vehicle, such as one or more systems of a semi-autonomous vehicle or an autonomous vehicle.

Aspects of a Vehicle Having Kinematically Stabilized Vehicle Control

FIG. 1 depicts an illustrative environment 100 of an ego-vehicle 102 having two other vehicles 104 and 106 traversing a road near the ego-vehicle 102. A predicted trajectory $T_{102}$ of the ego-vehicle 102 is depicted. The predicted trajectory $T_{102}$ is an example of a kinematically stable trajectory generated by the methods and system described herein. The predicted trajectory $T_{102}$ is defined by at least one or more curvatures over a period of time into the future and corresponding one or more accelerations. Also depicted in FIG. 1 is trajectory $T_{104}$ corresponding to a first vehicle 104 and trajectory $T_{106}$ corresponding to a second vehicle 106. Trajectories $T_{104}$ and $T_{106}$ are predicted by the machine learning model based on sensor data collected by sensors of the ego-vehicle 102. That is, the predicted trajectory $T_{102}$ is determine not only based on a navigation path (origin to destination) but also the dynamics of the environment around the ego-vehicle, so to avoid collisions, traffic, construction, and the like within the environment.

Figure 2:
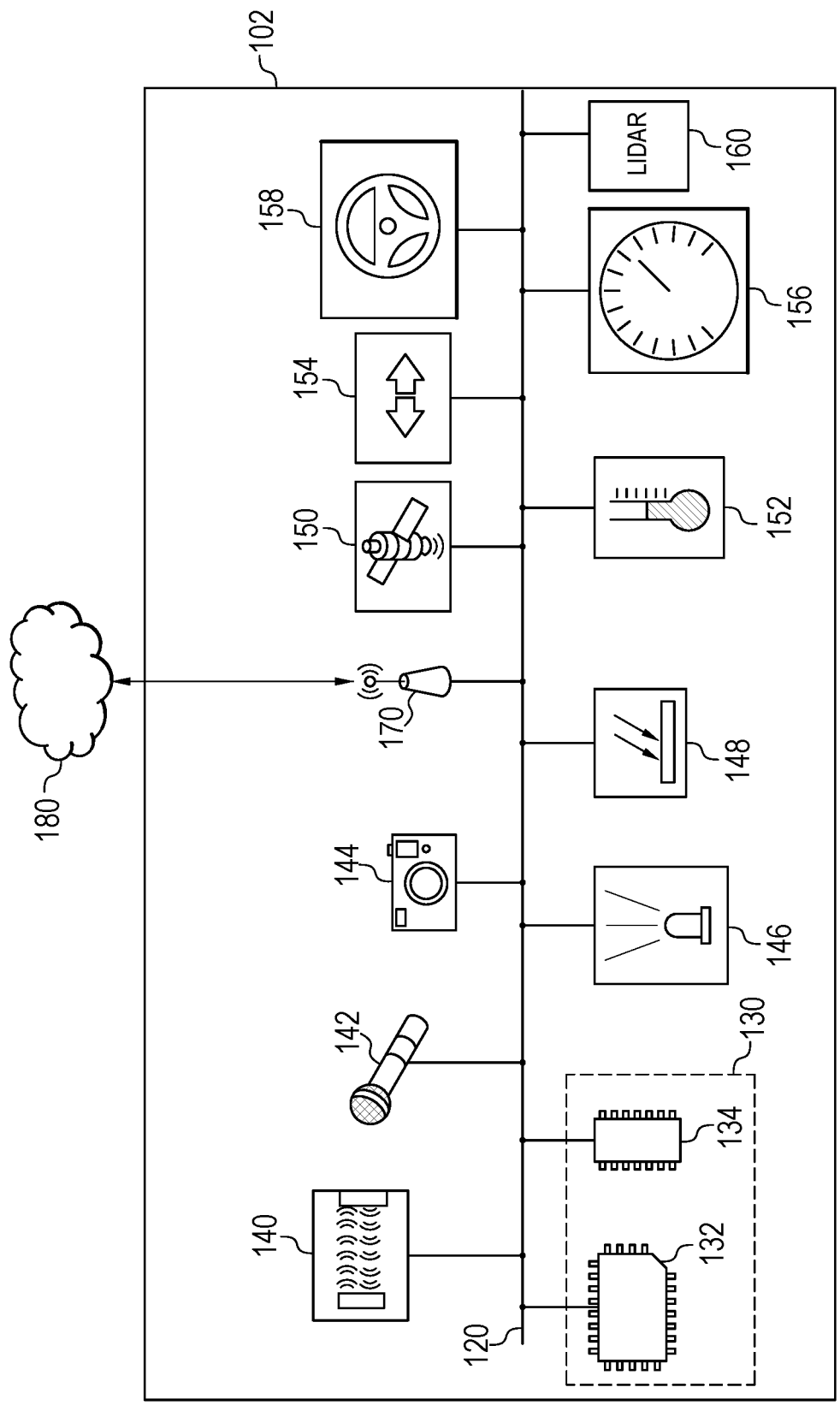
FIG. 2 depicts an illustrative ego-vehicle implemented with the vehicle control systems and methods described herein.

FIG. 2 depicts an illustrative ego-vehicle 102 implemented with the vehicle control systems and methods described herein. The ego-vehicle 102 depicted in FIG. 2 is depicted by way of an example schematic of a vehicle including sensor resources and a computing device. Not every vehicle is required to be equipped with the same set of sensor resources, nor is required to be configured with the same set of systems for perceiving attributes of an environment around the ego-vehicle 102. FIG. 2 only provides one example configuration of sensor resources and systems equipped within a vehicle. Furthermore, although FIG. 2 references ego-vehicle 102, any vehicle, for example vehicles 104 and 106, discussed and described herein may include the same or similar configuration as ego-vehicle 102 that is shown and described with respect to FIG. 2.

In particular, FIG. 2 provides an example schematic of a vehicle including a variety of sensor resources, which may be utilized, by an ego-vehicle 102 to perceive and collect sensor data about an attribute in the environment. For example, the ego-vehicle 102 may include a computing device 130 comprising a processor 132 and a non-transitory computer readable memory 134, a proximity sensor 140, a microphone 142, one or more cameras 144, an infrared light emitter 146 and infrared detector 148, a global positioning system (GPS) 150, weather sensors 152, a blind spot monitor 154 (e.g., a radar system), a vehicle speed sensor 156, a steering wheel sensor system 158, a LIDAR system 160, and network interface hardware 170. These and other components of the vehicle may be communicatively connected to each other via a communication path 120.

The communication path 120 may be formed from any medium that is capable of transmitting a signal such as, for example, conductive wires, conductive traces, optical waveguides, or the like. The communication path 120 may also refer to the expanse in which electromagnetic radiation and their corresponding electromagnetic waves traverses. Moreover, the communication path 120 may be formed from a combination of mediums capable of transmitting signals. In one embodiment, the communication path 120 comprises a combination of conductive traces, conductive wires, connectors, and buses that cooperate to permit the transmission of electrical data signals to components such as processors, memories, sensors, input devices, output devices, and communication devices. Accordingly, the communication path 120 may comprise a bus. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. As used herein, the term "communicatively coupled" means that coupled components are capable of exchanging signals with one another such as, for example, electrical signals via conductive medium, electromagnetic signals via air, optical signals via optical waveguides, and the like.

The computing device 130 may be any device or combination of components comprising one or more processors 132 and non-transitory computer readable memory, referred to herein as one or more memories 134. The one or more processors 132 may be any device capable of executing the processor-executable instructions stored in the one or more memories 134. Accordingly, the one or more processors 132 may be an electric controller, an integrated circuit, a microchip, a computer, or any other computing device. The one or more processors 132 are communicatively coupled to the other components of the ego-vehicle 102 by the communication path 120. Accordingly, the communication path 120 may communicatively couple any number of processors 132 with one another, and allow the components coupled to the communication path 120 to operate in a distributed computing environment. Specifically, each of the components may operate as a node that may send and/or receive data.

The one or more memories 134 may comprise RAM, ROM, flash memories, hard drives, or any non-transitory memory device capable of storing processor-executable instructions such that the processor-executable instructions can be accessed and executed by the one or more processors 132. The machine-readable instruction set may comprise logic or algorithm(s) written in any programming language of any generation (e.g., 1GL, 2GL, 3GL, 4GL, or 5GL) such as, for example, machine language that may be directly executed by the one or more processors 132, or assembly language, object-oriented programming (OOP), scripting languages, microcode, etc., that may be compiled or assembled into processor-executable instructions and stored in the one or more memories 134. Alternatively, the processor-executable instructions may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components.

Still referring to FIG. 2, the proximity sensor 140 may be any device or combination of components capable of outputting a signal indicative of the presence or absence of an object within or near the ego-vehicle 102. The proximity sensor 140 may also be a sensor capable of determining a range or distance to an object, for example the distance from the ego-vehicle 102 and another vehicle that is traveling in front of the vehicle 102. The proximity sensor 140 may include one or more sensors including, but not limited to, a camera, a laser distance sensor, an ultrasonic sensor, a radar sensor system, a motion sensor, a heat sensor, to determine the presence or absence of an object alongside, behind, or in front of the ego-vehicle 102. In some embodiments, one or more proximity sensors 140 may be configured to enable an around view monitoring system for the ego-vehicle 102.

The microphone 142 is coupled to the communication path 120 and communicatively coupled to the computing device 130. The microphone 142 may be any device capable of transforming a mechanical vibration associated with sound into an electrical signal indicative of the sound. The microphone 142 may be used to monitor sound levels for purposes such as determining the existence of traffic, approaching emergency vehicles, or the like within the environment of the ego-vehicle 102.

The ego-vehicle 102 may further include one or more cameras 144. The one or more cameras 144 may enable a variety of different monitoring, detection, control, and/or warning systems within the ego-vehicle 102. The one or more cameras 144 may be any device having an array of sensing devices (e.g., a CCD array or active pixel sensors) capable of detecting radiation in an ultraviolet wavelength band, a visible light wavelength band, or an infrared wavelength band. The one or more cameras 144 may have any resolution. The one or more cameras 144 may be an omni-direction camera or a panoramic camera. In some embodiments, one or more optical components, such as a mirror, fish-eye lens, or any other type of lens may be optically coupled to the one or more cameras 144.

In some embodiments, an infrared light emitter 146 and/or infrared detector 148 are coupled to the communication path 120 and communicatively coupled to the computing device 130. Infrared light, also known as infrared radiation is a type of electromagnetic (EM) radiation like visible light, but infrared light is generally invisible to the human eye. EM radiation is transmitted in waves or particles across a range of wavelengths and frequencies. Infrared light waves are longer than those of visible light, beyond the red end of the visible spectrum. An infrared light emitter 146 emits infrared light in the range of the (EM) spectrum between microwaves and visible light. Infrared light has frequencies from about 300 GHz up to about 400 THz and wavelengths of about 1 millimeter to 740 nanometers, although these values are not absolute. The spectrum of infrared light can be described in sub-divisions based on wavelength and frequency. For example, near-infrared may have a frequency of about 214 THz to about 400 THz and a wavelength to about 1400 nanometers of about 740 nanometers and far-infrared may have a frequency of about 300 GHz to about 20 THz and a wavelength of about 1 millimeter to about 15 micrometers. Infrared light may be subdivided into further divisions.

An infrared detector 148 may be configured to detect light emitted and/or reflected that is within the infrared light spectrum. The infrared light emitter 146 and infrared detector 148 may be implemented as sensor resources of a vehicle to provide computer vision and navigation capability to the ego-vehicle 102 during low light or poor weather conditions. The infrared detector 148 may be a device configured to capture the presence of infrared light, for example, determining the presence of a reflection of infrared light off an object or may include a CCD array or active pixel sensors that may be configured to generate an image of an environment that is illuminated by or that is producing infrared light.

Still referring to FIG. 2, a global positioning system, GPS 150, may be coupled to the communication path 120 and communicatively coupled to the computing device 130 of the ego-vehicle 102. The GPS 150 is capable of generating location information indicative of a location of the ego-vehicle 102 by receiving one or more GPS signals from one or more GPS satellites. The GPS signal communicated to the computing device 130 via the communication path 120 may include location information comprising a National Marine Electronics Association (NMEA) message, a latitude and longitude data set, a street address, a name of a known location based on a location database, or the like. Additionally, the GPS 150 may be interchangeable with any other system capable of generating an output indicative of a location. For example, a local positioning system that provides a location based on cellular signals and broadcast towers or a wireless signal detection device capable of triangulating a location by way of wireless signals received from one or more wireless signal antennas.

The ego-vehicle 102 may also include weather sensors 152, such as temperature sensors, precipitation gauges, wind meters, UV light sensors, or the like. The weather sensors 152 may be coupled to the communication path 120 and communicatively coupled to the computing device 130. The weather sensors 152 may be any device capable of outputting a signal indicative of a weather condition such as a temperature level, the presence or an amount of precipitation, the direction and/or speed of the wind, the presence and/or intensity of sunlight or the like. Information collected by the weather sensors 152 may provide the ego-vehicle 102 with information that defines the present weather conditions. In response, the ego-vehicle 102, for example, an autonomous vehicle, may reduce its speed in the event heavy rain fall is detected or prepare for longer stopping distances if the temperature is determined to be below freezing (i.e., in anticipation of icy roads). Similarly, for non-autonomous vehicles, information collected and processed from weather sensors, may prepare and enable assistive braking systems based on weather conditions and/or provide alerts to a driver of potentially hazardous road conditions.

The blind spot monitor 154 may include one or more proximity sensors 140, one or more cameras 144, and other sensors to detect the presence of a vehicle in a driver's blind spot. For example, during lane changing maneuvers the blind spot monitor may assist a driver in determining whether the lane in which they plan to enter is clear of traffic.

The ego-vehicle 102 may also include a vehicle speed sensor 156 coupled to the communication path 120 and communicatively coupled to the computing device 130. The vehicle speed sensor 156 may be any sensor or system of sensors for generating a signal indicative of vehicle speed. For example, without limitation, a vehicle speed sensor 156 may be a tachometer that is capable of generating a signal indicative of a rotation speed of a shaft of the ego-vehicle 102 engine or a drive shaft. Signals generated by the vehicle speed sensor 156 may be communicated to the computing device 130 and converted a vehicle speed value. The vehicle speed value is indicative of the speed of the ego-vehicle 102. In some embodiments, the vehicle speed sensor 156 comprises an opto-isolator slotted disk sensor, a Hall Effect sensor, a Doppler radar, or the like. In some embodiments, a vehicle speed sensor 156 may comprise data from a GPS 150 for determining the speed of the ego-vehicle 102. The vehicle speed sensor 156 may be provided so that the computing device 130 may determine when the ego-vehicle 102 accelerates, maintains a constant speed, slows down or is comes to a stop. For example, a vehicle speed sensor 156 may provide signals to the computing device 130 indicative of the ego-vehicle 102 slowing down due to a change in traffic conditions or prior to the vehicle performing a turning maneuver.

Still referring to FIG. 2, the steering wheel sensor system 158 may be coupled to the communication path 120 and communicatively coupled to the computing device 130. The steering wheel sensor system 158 may comprise a plurality of sensors located in the steering wheel for determining a driver grip on the steering wheel, the degree of rotation applied to the steering wheel or the forces applied in turning or maintaining the steering wheel. The steering wheel sensor system 158 may provide signals to the computing device 130 indicative of the location and number of hands on the steering wheel, the strength of the grip on the steering wheel, or changes in position of one or more hands on the steering wheel. The steering wheel sensor system 158, for example, without limitation, may include pressure sensors, inductive sensors, optical sensors, or the like. In addition to detecting the location, number, grip, and change in position of one or more hands on the steering wheel, the steering wheel sensor system 158 may also include one or more sensors indicating the rotational angle of the steering wheel and provide corresponding signals to the computing device 130.

In some embodiments, the ego-vehicle 102 may include a LIDAR system 160. The LIDAR system 160 is communicatively coupled to the communication path 120 and the computing device 130. A LIDAR system 160 or light detection and ranging is a system and method of using pulsed laser light to measure distances from the LIDAR system 160 to objects that reflect the pulsed laser light. A LIDAR system 160 may be made as solid-state devices with few or no moving parts, including those configured as optical phased array devices where its prism-like operation permits a wide field-of-view without the weight and size complexities associated with a traditional rotating LIDAR system 160. The LIDAR system 160 is particularly suited to measuring time-of-flight, which in turn can be correlated to distance measurements with objects that are within a field-of-view of the LIDAR system 160. By calculating the difference in return time of the various wavelengths of the pulsed laser light emitted by the LIDAR system 160, a digital 3-D representation of a target or environment may be generated. The pulsed laser light emitted by the LIDAR system 160 include emissions operated in or near the infrared range of the electromagnetic spectrum, for example, having emitted radiation of about 905 nanometers. Sensors such as LIDAR systems 160 can be used by vehicles 102 to provide detailed 3D spatial information for the identification of objects near the ego-vehicle 102, as well as the use of such information in the service of systems for vehicular mapping, navigation and autonomous operations, especially when used in conjunction with geo-referencing devices such as GPS 150 or a gyroscope-based inertial navigation unit (INU, not shown) or related dead-reckoning system.

Still referring to FIG. 2, vehicles are now more commonly equipped with vehicle-to-vehicle communication systems. Some of the systems rely on network interface hardware 170. The network interface hardware 170 may be coupled to the communication path 120 and communicatively coupled to the computing device 130. The network interface hardware 170 may be any device capable of transmitting and/or receiving data with a network 180 or directly with another vehicle (e.g., vehicle 104 or 106) equipped with a vehicle-to-vehicle communication system. Accordingly, network interface hardware 170 can include a communication transceiver for sending and/or receiving any wired or wireless communication. For example, the network interface hardware 170 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, network interface hardware 170 includes hardware configured to operate in accordance with the Bluetooth wireless communication protocol. In another embodiment, network interface hardware 170 may include a Bluetooth send/receive module for sending and receiving Bluetooth communications to/from a network 180 and/or another vehicle.

Figure 3:
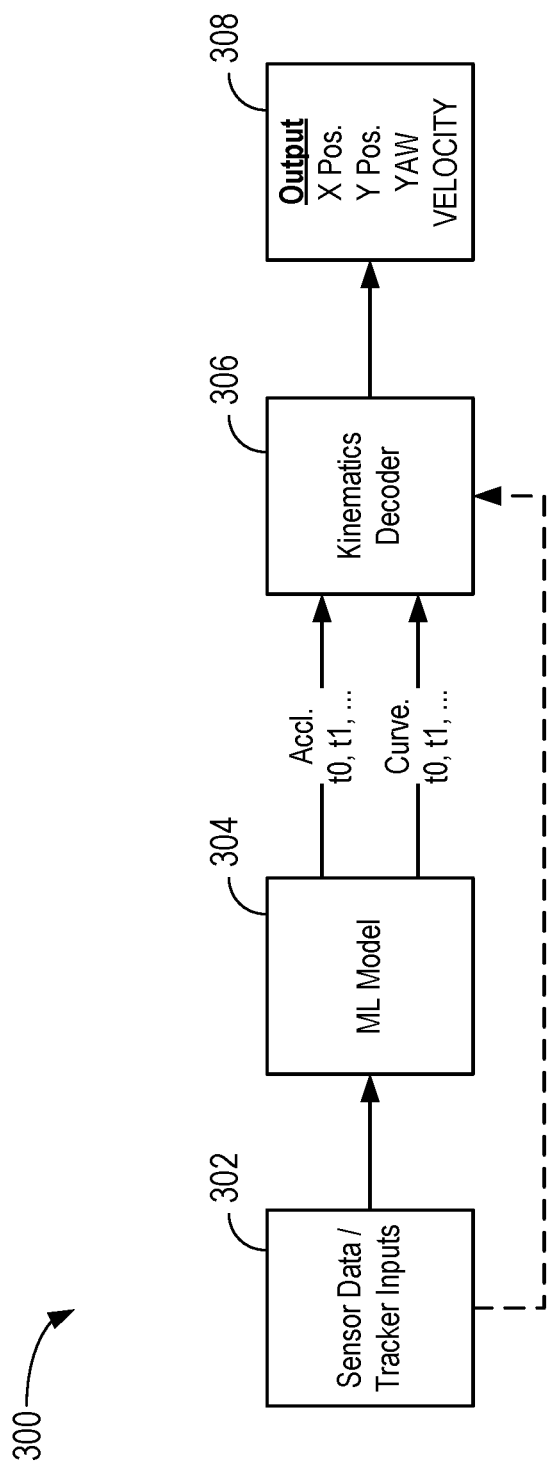
FIG. 3 depicts an illustrative block diagram of a framework for generating and controlling a vehicle based on a kinematically stable trajectory.

Aspects Related to Techniques for Generating Kinematically Stabilized Vehicle Controls FIG. 3 depicts an illustrative block diagram of a framework 300 for generating and controlling a vehicle based on a kinematically stable trajectory. The framework 300 includes an input block 302, a machine learning model block (e.g., a ML model 304), a kinematics decoder 306, and an output block 308. The framework 300 provides an integrated ML-Kinematics system configured to implement methods described herein to provide a kinematically stable trajectory for controlling a vehicle, such as the ego-vehicle depicted and described with reference to FIGS. 1 and 2. By integrating ML-based predictions from the ML model 304 with heuristic principles within a kinematics decoder 306, the framework 300 strikes a balance between adaptability and risk mitigation. The methods not only enhance the accuracy of trajectory predictions but also ensures that they are grounded in realistic, risk avoidance-conscious constraints, paving the way for more reliable autonomous driving technologies.

The input block 302 represents one or more operations by the ego-vehicle 102 (FIGS. 1 and 2), regarding collecting sensor data and any preprocessing of the sensor data for utilization by the ML model 304. For example, at the input block 302, the one or more sensors of the ego-vehicle 102 collect sensor data of the environment around the vehicle. The sensor data includes information about the ego-vehicle 102 as well as other objects (e.g., the first and second vehicles 104 and 106 depicted in FIG. 1). In some embodiments, the sensor data may be preprocessed. Preprocessing the sensor data may include generating sets of data, such as a set of images and other datasets that correspond to defined objects with the environment. For example, the sensor data may be classified as corresponding to the first vehicle 104, the second vehicle 106 or other distinct objects within the environment. Additionally, the sensor data may be organized into time series data set whereby, for example, a series of images are labeled with a time stamp so that individually classified dataset pertaining to unique objects in the environment may be correlated with each other based on time. The sensor data, whether preprocessed or not, is fed in one or more layers of a ML model 304.

The ML model is configured (e.g., trained) to ingest the sensor data and generate one or more accelerations and one or more curvatures defining a projected trajectory of the ego-vehicle 102. The ML model 304 may be a deep neural network such as a Long Short Term Memory (LSTM) model, a Gated Recurrent Units (GRU) model, a Stacked Autoencoders (SAEs) model, or another type of model.

The one or more accelerations and the one or more curvatures are based on data, such as position, yaw, velocity, and acceleration, corresponding to the ego-vehicle 102, and data, such as position, yaw, velocity, and acceleration, corresponding to the other objects with in the environment. The data, such as position, yaw, velocity, and acceleration, corresponding to the other objects with in the environment may be predicted by the ML model 304 based on the received sensor data. For example, the ML model 304 may be trained to determine a vehicle, such as the first vehicle's 104 position, yaw, velocity, and acceleration based on evaluation of one or more sequential images provided in the sensor data. Accordingly, the ML model 304 can predict trajectories for each of the one or more objects within the environment around the ego-vehicle 102 and subsequently generate one or more accelerations (e.g., accl. T0, t1, . . . ) and one or more curvatures (e.g., curve. T0, t1, . . . ) defining a predicted future trajectory of the ego-vehicle 102. The one or more accelerations (e.g., accl. T0, t1, . . . ) and one or more curvatures (e.g., curve. T0, t1, . . . ) may be a time series of values.

As the ML model 304 generated predicted values for the one or more accelerations (e.g., accl. T0, t1, . . . ) and the one or more curvatures (e.g., curve. T0, t1, . . . ) defining the predicted future trajectory of the ego-vehicle 102, they are fed into a kinematics decoder 306. The kinematics decoder 306 may incorporate a unicycle model, bicycle model, or dynamics model that are suitable for vehicular motion prediction. In some embodiments, the kinematics decoder 306 may also incorporate one or more heuristic-based constraints.

The kinematics decoder 306 evaluates the one or more accelerations (e.g., accl. T0, t1, . . . ) and the one or more curvatures (e.g., curve. T0, t1, . . . ) based on the unicycle model, bicycle model, or dynamics model and/or the one or more heuristic-based constraints to determine if they values are kinematically feasible for the ego-vehicle. For example, the kinematics decoder 306 can determine whether the one or more accelerations (e.g., accl. T0, t1, . . . ) and the one or more curvatures (e.g., curve. T0, t1, . . . ) correspond to a vehicle control input that the vehicle is unable to perform based on the specification of the vehicle. For example, a curvature and/or an acceleration may be outside of the capabilities of the vehicle. In other words, an acceleration for input to a vehicle control may be greater that a maximum acceleration for the vehicle. Likewise, a curvature may be greater than a turning radius of the vehicle. Additionally, the kinematics decoder 306 can evaluate the one or more accelerations (e.g., accl. T0, t1, . . . ) and the one or more curvatures (e.g., curve. T0, t1, . . . ) in combination to determine, for example, whether an acceleration is too great for a predicted curvature.

In some embodiments, the predicted values for the one or more accelerations (e.g., accl. T0, t1, . . . ) and the one or more curvatures (e.g., curve. T0, t1, . . . ) may not be realistic values. For example, an acceleration may be predicted as a positive value whereas it should be a negative value because over the past time series of data the kinematics decoder 306 has knowledge that the ego-vehicle 102 has closed the gap on another object in the environment. That is, in some embodiments, the sensor data from the input block 302 may also be provided to the kinematics decoder 306 and utilized by the kinematics decoder 306 to validate the one or more accelerations (e.g., accl. T0, t1, . . . ) and the one or more curvatures (e.g., curve. T0, t1, . . . ) from the ML model 304.

In some embodiments, the kinematics decoder 306 determines whether the one or more accelerations (e.g., accl. T0, t1, . . . ) and the one or more curvatures (e.g., curve. T0, t1, . . . ) are limited by the current state of the ego-vehicle 102. For example, sensor data may indicate that the roads are wet based on weather information. Therefore, the kinematics decoder 306 may implement one or more heuristic-based constraints that reduce one or more threshold values (e.g., maximum acceleration, maximum velocity, maximum curvature or steering angle input, or the like) based on knowledge of the weather. In some instances, the kinematics decoder 306 may implement one or more heuristic-based constraints based on the current state of the ego-vehicle 102, such as whether the vehicle has lost traction or is implementing an emergent maneuver in response to another driver assistance system. Furthermore, in some embodiments, the sensor data from the input block 302 may include diver behaviors such as eye gaze, awareness assessment, or the like. Indications of driver behaviors may also cause the kinematics decoder 306 to adjust one or more heuristic-based constraints.

As described herein, the process of evaluating the acceleration and the curvature with the kinematics decoder may include applying one or more constraints defined in the kinematics decoder, where the one or more constraints comprise at least one of a threshold velocity, a threshold acceleration, or a threshold steering angle corresponding to the ego-vehicle. The kinematics decoder 306 may determine the one or more constraints based on sensor data and a history of trajectories of the ego-vehicle. As a result, the kinematics decoder 306 may adjust at least one of the acceleration or the curvature based on the one or more constraints. The kinematics decoder 306 generates one or more outputs based on evaluation of the acceleration and the curvature. The one or more outputs, for example, provided at the output block 308, define the kinematically stable trajectory for controlling the ego-vehicle. The one or more outputs are subsequently implemented to control the ego-vehicle.

As described herein, integration of ML model 304 and the kinematics decoder 306 enables the ML model 304 to predict acceleration and curvature, while the kinematics decoder 306 intelligently integrates these predictions with heuristic-based constraints (e.g., like acceleration limits) to ensure stability and adherence to risk avoidance norms. In some embodiments, the system interprets acceleration and velocity limits by analyzing the input history from the tracker inputs (e.g., from the input block 302). This approach allows the system to dynamically adjust heuristic constraints based on real-time data and past behavioral patterns of the vehicle, thereby enhancing the prediction model's responsiveness to varying driving scenarios. Through the implementation of a kinematic rollout process, the kinematics decoder 306 applies the combined ML model 304 predictions and heuristic-based inputs to generate kinematically feasible trajectories, ensuring both accuracy and risk avoidance measures are implemented.

Example Operations of Vehicle Control System

Figure 4:
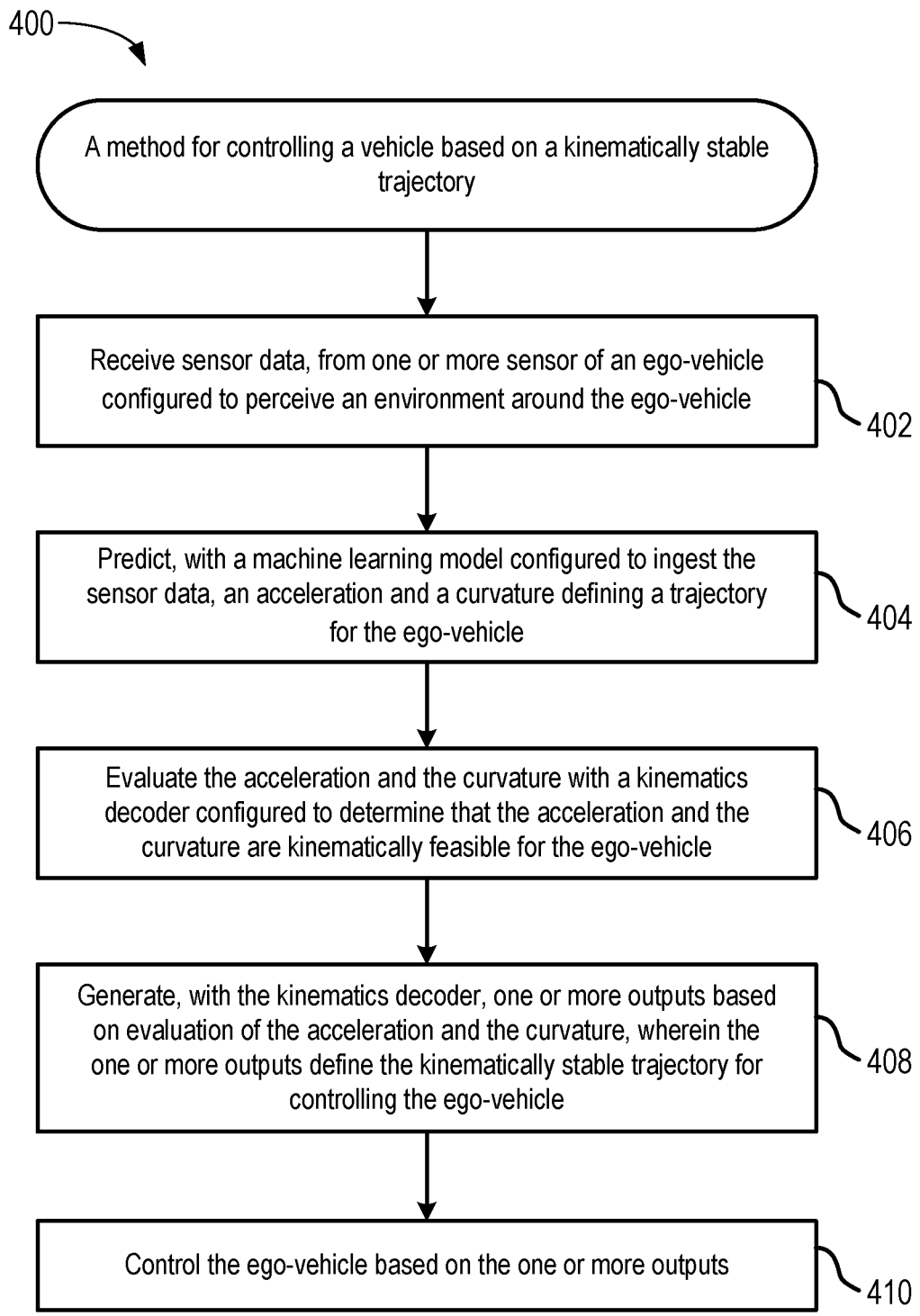
FIG. 4 depicts an example method for controlling a vehicle based on a kinematically stable trajectory.

FIG. 4 depicts an example method 400 for controlling a vehicle based on a kinematically stable trajectory.

In this example, method 400 begins at step 402 with receiving sensor data, from one or more sensor of an ego-vehicle configured to perceive an environment around the ego-vehicle. For example, step 402 may be performed by the apparatus 500 as described herein with reference to FIG. 5 that is configured to perform at least the process corresponding to the input block 302 as described above with reference to FIG. 3.

Method 400 proceeds to step 404 with predicting, with a machine learning model configured to ingest the sensor data, an acceleration and a curvature defining a trajectory for the ego-vehicle. For example, step 404 may be performed by the apparatus 500 as described herein with reference to FIG. 5 that is configured to perform the process corresponding to the ML model 304 as described above with reference to FIG. 3.

Method 400 proceeds to step 406 with evaluating the acceleration and the curvature with a kinematics decoder configured to determine that the acceleration and the curvature are kinematically feasible for the ego-vehicle. For example, step 406 may be performed by the apparatus 500 as described herein with reference to FIG. 5 that is configured to perform the process corresponding to kinematics decoder 306 as described above with reference to FIG. 3.

Method 400 proceeds to step 408 with generating, with the kinematics decoder, one or more outputs based on evaluation of the acceleration and the curvature, wherein the one or more outputs define the kinematically stable trajectory for controlling the ego-vehicle. For example, step 408 may be performed by the apparatus 500 as described herein with reference to FIG. 5 that is configured to perform the process corresponding to the kinematics decoder 306 as described above with reference to FIG. 3.

Method 400 proceeds to step 410 with controlling the ego-vehicle based on the one or more outputs. For example, step 410 may be performed by the apparatus 500 as described herein with reference to FIG. 5 that is configured to perform the processes corresponding to output block 308 as described above with reference to FIG. 3.

In some aspects, the method 400 includes where the one or more outputs comprise a position, a yaw, and a velocity.

In some aspects, the method 400 includes where the acceleration and the curvature defining the trajectory for the ego-vehicle comprises a predicted series of accelerations and curvatures and the kinematics decoder is configured to evaluate the predicted series of accelerations and curvatures to generate the one or more outputs, wherein the one or more outputs define the kinematically stable trajectory for the ego-vehicle.

In some aspects, the method 400 includes where the kinematics decoder invokes a unicycle model for evaluating the acceleration and the curvature.

In some aspects, the method 400 further includes where evaluating the acceleration and the curvature with the kinematics decoder comprises applying one or more constraints defined in the kinematics decoder, the one or more constraints comprise at least one of a threshold velocity, a threshold acceleration, or a threshold steering angle corresponding to the ego-vehicle.

In some aspects, the method 400 further includes determining, with the kinematics decoder, one or more constraints based on sensor data and a history of trajectories of the ego-vehicle, and adjusting, with the kinematics decoder, at least one of the acceleration or the curvature based on the one or more constraints.

In some aspects, the method 400 further includes where the sensor data comprises image or video data and distance and ranging data from at least one of a camera system, a LiDAR system, or a radar system.

In some aspects, the method 400 further includes where predicting, with the machine learning model, the acceleration and the curvature defining the trajectory for the ego-vehicle comprises: determining a future trajectory of one or more other objects in the environment around the ego-vehicle based on the sensor data; and determining the acceleration and the curvature defining the trajectory for the ego-vehicle based on the future trajectory of the one or more other objects.

Note that FIG. 4 is just one example of a method, and other methods including fewer, additional, or alternative steps are possible consistent with this disclosure.

Example Computing Device for Implementing the Vehicle Control Method using Kinematically Stabilized Machine-Learning Model Predicted Controls.

Figure 5:
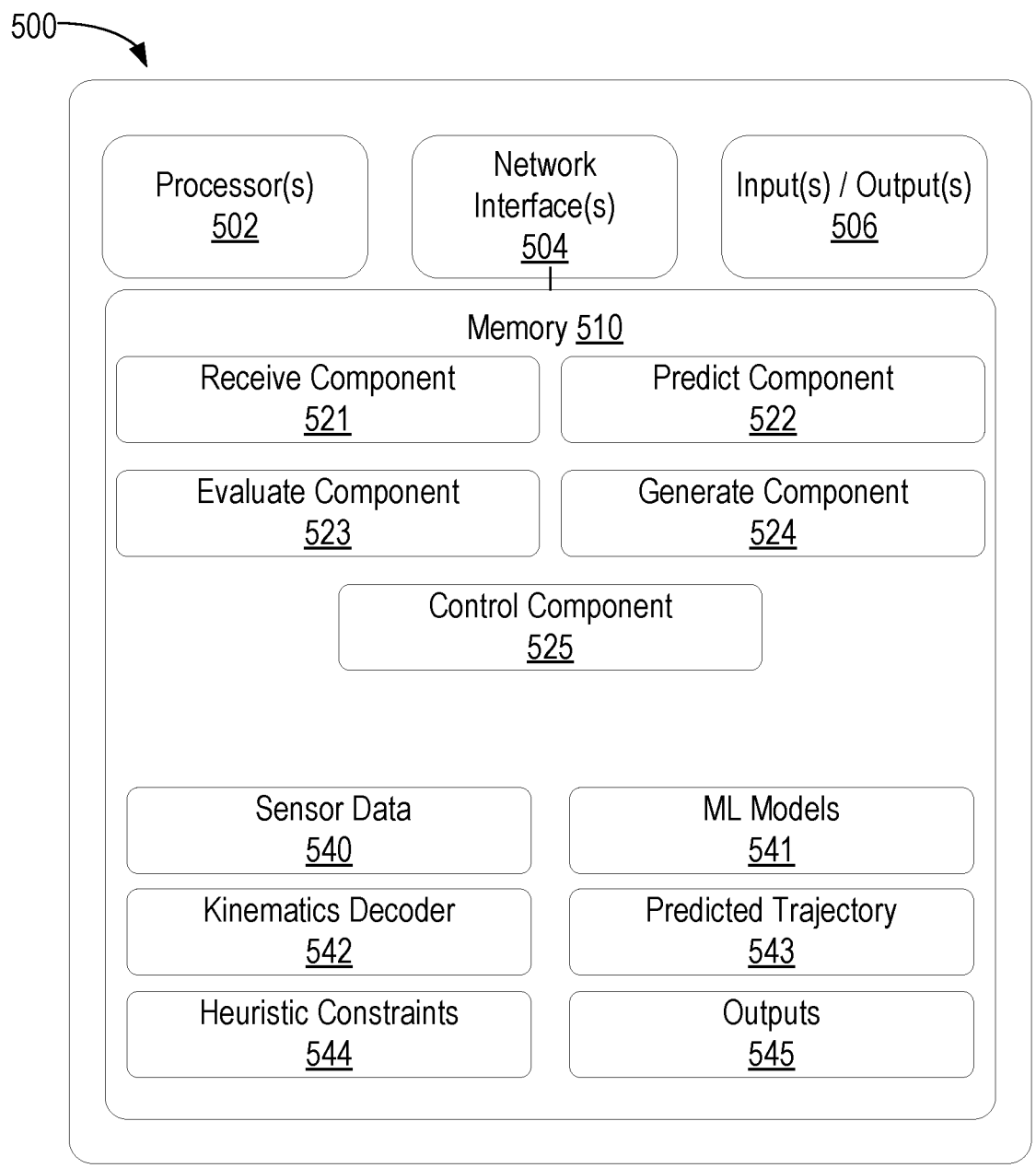
FIG. 5 depicts an example apparatus configured to perform the methods described herein.

FIG. 5 depicts an example apparatus 500 configured to perform the methods described herein.

Apparatus 500 includes one or more processors 502. Generally, processor(s) 502 may be configured to execute computer-executable instructions (e.g., software code) to perform various functions, as described herein.

Apparatus 500 further includes a network interface(s) 504, which generally provides data access to any sort of data network, including personal area networks (PANs), local area networks (LANs), wide area networks (WANs), the Internet, and the like.

Apparatus 500 further includes input(s) and output(s) 506, which generally provide means for providing data to and from apparatus 500, such as via connection to computing device peripherals, including user interface peripherals.

Apparatus 500 further includes a memory 510 configured to store various types of components and data.

In this example, memory 510 includes a receive component 521, a predict component 522, an evaluate component 523, a generate component 524, and a control component 525.

The receive component 521 is configured to perform step 402 of the method 400 depicted and described with reference to FIG. 4.

The predict component 522 is configured to perform step 404 of the method 400 depicted and described with reference to FIG. 4 and ML model 304 depicted and described with reference to FIG. 3.

The evaluate component 523 is configured to perform step 406 of the method 400 depicted and described with reference to FIG. 4 and the kinematics decoder 306 depicted and described with reference to FIG. 3.

The generate component 524 is configured to perform step 408 of the method 400 depicted and described with reference to FIG. 4 and the kinematics decoder 306 depicted and described with reference to FIG. 3.

The control component 525 is configured to perform step 410 of the method 400 depicted and described with reference to FIG. 4.

In this example, memory 510 also includes sensor data 540, ML models 541, kinematics decoder 542, predicted trajectory 543, heuristic constraints 544, and outputs 545 as described herein.

Apparatus 500 may be implemented in various ways. For example, apparatus 500 may be implemented within on-site, remote, or cloud-based processing equipment.

Apparatus 500 is just one example, and other configurations are possible. For example, in alternative embodiments, aspects described with respect to apparatus 500 may be omitted, added, or substituted for alternative aspects.

Example Clauses

Implementation examples are described in the following numbered clauses:

Clause 1: A method for controlling a vehicle based on a kinematically stable trajectory, the method comprising: receiving sensor data, from one or more sensor of an ego-vehicle configured to perceive an environment around the ego-vehicle; predicting, with a machine learning model configured to ingest the sensor data, an acceleration and a curvature defining a trajectory for the ego-vehicle; evaluating the acceleration and the curvature with a kinematics decoder configured to determine that the acceleration and the curvature are kinematically feasible for the ego-vehicle; generating, with the kinematics decoder, one or more outputs based on evaluation of the acceleration and the curvature, wherein the one or more outputs define the kinematically stable trajectory for controlling the ego-vehicle; and controlling the ego-vehicle based on the one or more outputs.

Clause 2: The method of Clause 1, wherein the one or more outputs comprise a position, a yaw, and a velocity.

Clause 3: The method of Clause 1 or 2, wherein the acceleration and the curvature defining the trajectory for the ego-vehicle comprises a predicted series of accelerations and curvatures and the kinematics decoder is configured to evaluate the predicted series of accelerations and curvatures to generate the one or more outputs, wherein the one or more outputs define the kinematically stable trajectory for the ego-vehicle.

Clause 4: The method of any one of Clauses 1-3, wherein the kinematics decoder invokes a unicycle model for evaluating the acceleration and the curvature.

Clause 5: The method of any one of Clauses 1-4, wherein evaluating the acceleration and the curvature with the kinematics decoder comprises applying one or more constraints defined in the kinematics decoder, the one or more constraints comprise at least one of a threshold velocity, a threshold acceleration, or a threshold steering angle corresponding to the ego-vehicle.

Clause 6: The method of any one of Clauses 1-5, further comprising: determining, with the kinematics decoder, one or more constraints based on sensor data and a history of trajectories of the ego-vehicle, and adjusting, with the kinematics decoder, at least one of the acceleration or the curvature based on the one or more constraints.

Clause 7: The method of any one of Clauses 1-6, wherein the sensor data comprises image or video data and distance and ranging data from at least one of a camera system, a LiDAR system, or a radar system.

Clause 8: The method of any one of Clauses 1-7, wherein predicting, with the machine learning model, the acceleration and the curvature defining the trajectory for the ego-vehicle comprises: determining a future trajectory of one or more other objects in the environment around the ego-vehicle based on the sensor data; and determining the acceleration and the curvature defining the trajectory for the ego-vehicle based on the future trajectory of the one or more other objects.

Clause 10: An apparatus for controlling a vehicle based on a kinematically stable trajectory, comprising: one or more memories comprising processor-executable instructions; and one or more processors configured to execute the processor-executable instructions and cause the apparatus to perform a method in accordance with any one of Clauses 1-9.

Clause 11: A processing system, comprising: a memory comprising computer-executable instructions; and a processor configured to execute the computer-executable instructions and cause the processing system to perform a method in accordance with any one of Clauses 1-9.

Clause 12: A processing system, comprising means for performing a method in accordance with any one of Clauses 1-9.

Clause 13: A non-transitory computer-readable medium comprising computer-executable instructions that, when executed by a processor of a processing system, cause the processing system to perform a method in accordance with any one of Clauses 1-9.

Clause 14: A computer program product embodied on a computer-readable storage medium comprising code for performing a method in accordance with any one of Clauses 1-9.

ADDITIONAL CONSIDERATIONS

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, "coupled to" and "coupled with" generally encompass direct coupling and indirect coupling (e.g., including intermediary coupled aspects) unless stated otherwise. For example, stating that a processor is coupled to a memory allows for a direct coupling or a coupling via an intermediary aspect, such as a bus.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Reference to an element in the singular is not intended to mean only one unless specifically so stated, but rather "one or more." For example, reference to an element (e.g., "a processor," "a controller," "a memory," etc.), unless otherwise specifically stated, should be understood to refer to one or more elements (e.g., "one or more processors," "one or more controllers," "one or more memories," etc.). The terms "set" and "group" are intended to include one or more elements, and may be used interchangeably with "one or more." Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions. Unless specifically stated otherwise, the term "some" refers to one or more. All structural and functional equivalents to the elements of the various aspects described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims.

What is claimed is:

1. A method for controlling an ego-vehicle based on a kinematically stable trajectory, the method comprising:
    receiving sensor data, from one or more sensors of the ego-vehicle configured to perceive an environment around the ego-vehicle;
    predicting, with a machine learning model configured to ingest the sensor data, an acceleration and a curvature defining a trajectory for the ego-vehicle;
    evaluating the acceleration and the curvature with a kinematics decoder that incorporates knowledge of capabilities of the ego-vehicle to determine that the acceleration and the curvature are kinematically feasible for the ego-vehicle;
    generating, with the kinematics decoder, one or more outputs based on evaluation of the acceleration and the curvature, wherein the one or more outputs define the kinematically stable trajectory for controlling the ego-vehicle; and
    controlling the ego-vehicle based on the one or more outputs.

2. The method of claim 1, wherein the one or more outputs comprise a position, a yaw, and a velocity.

3. The method of claim 1, wherein the acceleration and the curvature defining the trajectory for the ego-vehicle comprises a predicted series of accelerations and curvatures and the kinematics decoder is configured to evaluate the predicted series of accelerations and curvatures to generate the one or more outputs, wherein the one or more outputs define the kinematically stable trajectory for the ego-vehicle.

4. The method of claim 1, wherein the kinematics decoder invokes a unicycle model for evaluating the acceleration and the curvature.

5. The method of claim 1, wherein evaluating the acceleration and the curvature with the kinematics decoder comprises applying one or more constraints defined in the kinematics decoder, the one or more constraints comprise at least one of a threshold velocity, a threshold acceleration, or a threshold steering angle corresponding to the ego-vehicle.

6. The method of claim 1, further comprising:
    determining, with the kinematics decoder, one or more constraints based on sensor data and a history of trajectories of the ego-vehicle, and
    adjusting, with the kinematics decoder, at least one of the acceleration or the curvature based on the one or more constraints.

7. The method of claim 1, wherein the sensor data comprises image or video data and distance and ranging data from at least one of a camera system, a LiDAR system, or a radar system.

8. The method of claim 1, wherein predicting, with the machine learning model, the acceleration and the curvature defining the trajectory for the ego-vehicle comprises:
    determining a future trajectory of one or more other objects in the environment around the ego-vehicle based on the sensor data; and
    determining the acceleration and the curvature defining the trajectory for the ego-vehicle based on the future trajectory of the one or more other objects.

9. An apparatus for controlling an ego-vehicle based on a kinematically stable trajectory, comprising: one or more memories comprising processor-executable instructions;

and one or more processors configured to execute the processor-executable instructions and cause the apparatus to:
receive sensor data, from one or more sensors of the ego-vehicle configured to perceive an environment around the ego-vehicle;
predict, with a machine learning model configured to ingest the sensor data, an acceleration and a curvature defining a trajectory for the ego-vehicle;
evaluate the acceleration and the curvature with a kinematics decoder that incorporates knowledge of capabilities of the ego-vehicle to determine that the acceleration and the curvature are kinematically feasible for the ego-vehicle;
generate, with the kinematics decoder, one or more outputs based on evaluation of the acceleration and the curvature, wherein the one or more outputs define the kinematically stable trajectory for controlling the ego-vehicle; and
control the ego-vehicle based on the one or more outputs.

10. The apparatus of claim 9, wherein the one or more outputs comprise a position, a yaw, and a velocity.

11. The apparatus of claim 9, wherein the acceleration and the curvature defining the trajectory for the ego-vehicle comprises a predicted series of accelerations and curvatures and the kinematics decoder is configured to evaluate the predicted series of accelerations and curvatures to generate the one or more outputs, wherein the one or more outputs define the kinematically stable trajectory for the ego-vehicle.

12. The apparatus of claim 9, wherein the kinematics decoder invokes a unicycle model for evaluating the acceleration and the curvature.

13. The apparatus of claim 9, wherein to evaluate the acceleration and the curvature with the kinematics decoder, the one or more processors are configured to apply one or more constraints defined in the kinematics decoder, the one or more constraints comprise at least one of a threshold velocity, a threshold acceleration, or a threshold steering angle corresponding to the ego-vehicle.

14. The apparatus of claim 9, wherein the one or more processors are configured to execute the processor-executable instructions and further cause the apparatus to:
determine, with the kinematics decoder, one or more constraints based on sensor data and a history of trajectories of the ego-vehicle, and
adjust, with the kinematics decoder, at least one of the acceleration or the curvature based on the one or more constraints.

15. The apparatus of claim 9, wherein the sensor data comprises image or video data and distance and ranging data from at least one of a camera system, a LiDAR system, or a radar system.

16. The apparatus of claim 9, wherein to predict, with the machine learning model, the acceleration and the curvature defining the trajectory for the ego-vehicle, the one or more processors are configured to:
determine a future trajectory of one or more other objects in the environment around the ego-vehicle based on the sensor data; and
determine the acceleration and the curvature defining the trajectory for the ego-vehicle based on the future trajectory of the one or more other objects.

17. A vehicle comprising:
one or more sensors configured to collect sensor data of an environment around the vehicle; and
a computing device comprising one or more memories comprising processor-executable instructions; and one or more processors configured to execute the processor-executable instructions causing the computing device to:
predict, with a machine learning model configured to ingest the sensor data, an acceleration and a curvature defining a trajectory for the vehicle;
evaluate the acceleration and the curvature with a kinematics decoder that incorporates knowledge of capabilities of the vehicle to determine that the acceleration and the curvature are kinematically feasible for the vehicle;
generate, with the kinematics decoder, one or more outputs based on evaluation of the acceleration and the curvature, wherein the one or more outputs define a kinematically stable trajectory for controlling the vehicle; and
control the vehicle based on the one or more outputs.

18. The vehicle of claim 17, wherein the acceleration and the curvature defining the trajectory for the vehicle comprises a predicted series of accelerations and curvatures and the kinematics decoder is configured to evaluate the predicted series of accelerations and curvatures to generate the one or more outputs, wherein the one or more outputs define the kinematically stable trajectory for the vehicle.

19. The vehicle of claim 17, wherein the one or more processors are configured to execute the processor-executable instructions and further cause the computing device to:
determine, with the kinematics decoder, one or more constraints based on sensor data and a history of trajectories of the vehicle, and
adjust, with the kinematics decoder, at least one of the acceleration or the curvature based on the one or more constraints.

20. The vehicle of claim 17, wherein to predict, with the machine learning model, the acceleration and the curvature defining the trajectory for the vehicle, the one or more processors are configured to:
determine a future trajectory of one or more other objects in the environment around the vehicle based on the sensor data; and
determine the acceleration and the curvature defining the trajectory for the vehicle based on the future trajectory of the one or more other objects.

* * * * *